(12) United States Patent
Hu et al.

(10) Patent No.: US 9,127,621 B2
(45) Date of Patent: Sep. 8, 2015

(54) COATINGLESS CYLINDER HEAD GASKET

(71) Applicant: Federal-Mogul Corporation, Southfield, MI (US)

(72) Inventors: Jake Hu, Canton, MI (US); Takshi Okano, Commerce, MI (US); Dan Vialard, Canton, MI (US); Jim Zwick, Brighton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/482,230

(22) Filed: Sep. 10, 2014

(65) Prior Publication Data
US 2015/0069719 A1 Mar. 12, 2015

Related U.S. Application Data

(60) Provisional application No. 61/876,068, filed on Sep. 10, 2013.

(51) Int. Cl.
F16J 15/08 (2006.01)
F02F 11/00 (2006.01)

(52) U.S. Cl.
CPC .......... F02F 11/002 (2013.01); F16J 15/0818 (2013.01); *F16J 2015/085* (2013.01); *F16J 2015/0843* (2013.01); *F16J 2015/0856* (2013.01)

(58) Field of Classification Search
CPC ................................ F02F 11/00; F02F 11/002
See application file for complete search history.

(56) References Cited

U.S. PATENT DOCUMENTS 5,255,926 A 10/1993 Udagawa
5,277,434 A * 1/1994 Kestly et al. .................. 277/592
(Continued)

FOREIGN PATENT DOCUMENTS

JP 2000028002 A 1/2000
WO 0196042 A2 12/2001

OTHER PUBLICATIONS

"Multilayer Steel Gaskets. A Soft Organic Coating Applied to the Metal of Multilayer-Stainless-Steel Head and Exhaust Manifold Gaskets Results in Greatly Improved Sealing", Automotive Engineering, Society of Automotive Engineers. Warrendale, vol. 102 US, No. 10, Oct. 1, 1993, pp. 75-77 (p. 1R; Figures 1, 4; p. 2L).
(Continued)

*Primary Examiner* — Gilbert Lee
(74) *Attorney, Agent, or Firm* — Robert L. Stearns; Dickinson Wright PLLC

(57) ABSTRACT

A multi-layer cylinder head gasket providing improved sealing performance, stability, and a more rigid joint between two components is provided. The gasket includes a plurality of functional layers each including a full bead located between an inner edge and outer edge and surrounding a combustion chamber opening. A stopper is disposed between the functional layers and is located radially between the combustion chamber opening and the full bead. A coating material is applied to at least one surface of at least one functional layer and extends along a majority of the length of the functional layer. To achieve the improved performance, a region along the surface located between the inner edge and the full bead remains uncoated, or includes a reduced amount of the coating material. Alternatively, the stopper can be located between the combustion chamber opening and the inner edges of the functional layers to provide the uncoated region.

20 Claims, 3 Drawing Sheets

(56) References Cited

U.S. PATENT DOCUMENTS

| | | | |
|---|---|---|---|
| 5,451,063 A | 9/1995 | Udagawa et al. | |
| 5,634,646 A | 6/1997 | Miyaoh | |
| 6,182,976 B1 | 2/2001 | Maekawa et al. | |
| 6,299,175 B1 | 10/2001 | Maekawa et al. | |
| 6,328,313 B1* | 12/2001 | Teranishi et al. | 277/592 |
| 6,336,639 B1 | 1/2002 | Ishida et al. | |
| 6,981,703 B2 | 1/2006 | Kinoshita | |
| 2002/0050687 A1 | 5/2002 | Ogaeri et al. | |
| 2002/0149155 A1* | 10/2002 | Schmauder | 277/591 |
| 2003/0075875 A1* | 4/2003 | Kato | 277/593 |
| 2003/0127805 A1 | 7/2003 | Stapel | |
| 2004/0256129 A1* | 12/2004 | Matsumoto et al. | 174/35 R |
| 2005/0151326 A1* | 7/2005 | Wade | 277/592 |
| 2006/0232017 A1* | 10/2006 | Hamada et al. | 277/594 |
| 2007/0262535 A1 | 11/2007 | Imai | |
| 2011/0192369 A1 | 8/2011 | Schmitz | |
| 2013/0320630 A1 | 12/2013 | Okano | |
| 2014/0042711 A1* | 2/2014 | Foster et al. | 277/594 |

OTHER PUBLICATIONS

Barrett J: "Live Gaskets Seal Active Joints," Eureka, Findlay Publications Ltd., Dartford, GB, vol. 14, No. 4, Apr. 1, 1994, p. 24/25 (p. 2).

Diez A et al: "Zylinderkopfdichtungskozepte Fuer Zukuenftige Motogenerationen", MTZ Motortechnische Zeitschrift, Verlag, Wiesbaden, DE,vol. 62, No. 1, Vieweg Jan. 1, 2001, pp. 30-35 (p. 4; figures 8-10).

International Search Report, mailed Feb. 25, 2015 (PCT/US2014/054918).

\* cited by examiner

COATINGLESS CYLINDER HEAD GASKET

CROSS REFERENCE TO RELATED APPLICATION

This utility application claims the benefit of U.S. provisional patent application Ser. No. 61/876,068, filed Sep. 10, 2013, the entire content of which is incorporated herein by reference.

BACKGROUND OF THE INVENTION

1. Field of the Invention

This invention relates generally to gaskets for providing a seal between two components, and more particularly to multi-layer gaskets, such as cylinder head gaskets.

2. Related Art

Cylinder head gaskets, particularly multi-layered gaskets, are commonly used in vehicle engines. The gaskets form a seal between mating components of the engine, particularly around cylinder bores presenting combustion chamber openings, in order to prevent leakage of combustion gases and engine fluids. Cylinder head gaskets typically extend circumferentially around the cylinder bores and are positioned between an engine block and a cylinder head.

Such cylinder head gaskets are commonly formed of multiple layers of a metal material, such as stainless steel, and typically have one or more sealing beads spaced annularly around the combustion chamber opening, or another opening or edge, to facilitate a tight seal between the engine block and cylinder head. The multi-layered gaskets can also have a stopper for controlling compression or adjusting the load on the beads. The metal layers are typically coated with a coating material to assist in sealing the metal layers together and preventing fluid or gas leaks between the engine block and cylinder head. Without the coating material, a higher load would be necessary to seal the layers. The coating material also fills any imperfections in the surfaces of the layers.

It has been found, however, that such coating materials can cause instability between the cylinder head and engine block due to compression, recovery, and wear of the coating material. Over time, the coating material, which is not as hard or durable as the metal layers, can soften. The coating material can also extrude under high pressures causing misalignment.

SUMMARY OF THE INVENTION

The invention provides for a coated multi-layer gasket with improved performance, including increased stability and a more rigid joint between two components, while avoiding the problems associated with conventional coated multi-layer gaskets. The multi-layer gasket includes a first functional layer extending between a first inner edge surrounding a combustion chamber opening and a first outer edge. The first inner edge and the first outer edge present a length therebetween. The first functional layer also presents a first outer surface and an oppositely facing first inner surface, and includes a first full bead disposed radially between the first inner edge the first outer edge.

A second functional layer extends between a second inner edge surrounding the combustion chamber opening and a second outer edge. The second inner edge and the second outer edge present a length therebetween. The second functional layer also presents a second outer surface and an oppositely facing second inner surface, and includes a second full bead axially aligned with the first full bead.

A stopper is disposed between the first and second functional layers and radially between the inner edge and the full bead of at least one of the functional layers. A coating material is disposed on at least one of the surfaces of at least one of the functional layers, and the coating material extends along a majority of the length of the at least one surface. However, a reduced amount of the coating material is disposed along a region of the at least one surface located between the inner edge and the full bead.

In another embodiment of the invention, the stopper is provided by a stopper layer which is disposed between the first and second functional layers. The stopper layer extends radially between a fifth inner edge surrounding the combustion chamber opening and a fifth outer edge. In this embodiment, the stopper is disposed radially between the combustion chamber opening and the inner edges of the functional layers. The coating material is disposed on at least one of the surfaces, and in this embodiment, the coating material extends continuously from the inner edge to the outer edge of the at least one functional layer.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
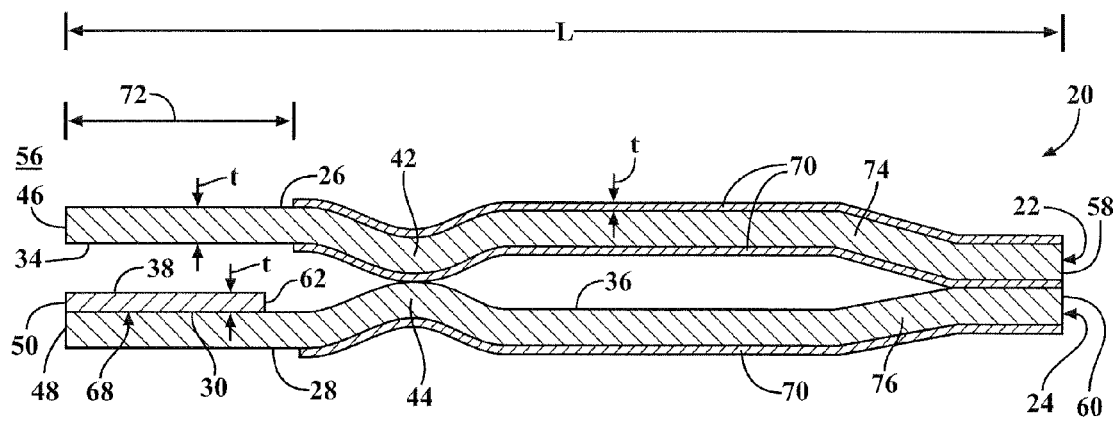
FIG. 1 is a radial cross-sectional side view of a coated multi-layer gasket according to a first exemplary embodiment of the invention.
Figure 2:
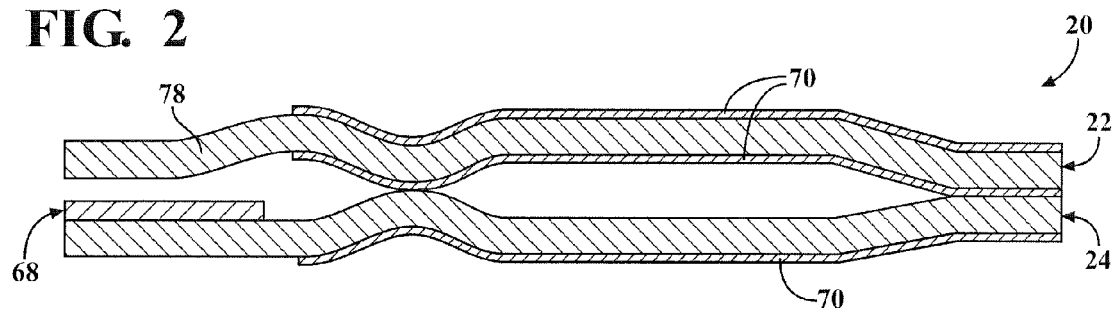
FIG. 2 is a radial cross-sectional side view of the coated multi-layer gasket according to a second exemplary embodiment of the invention.
Figure 3:
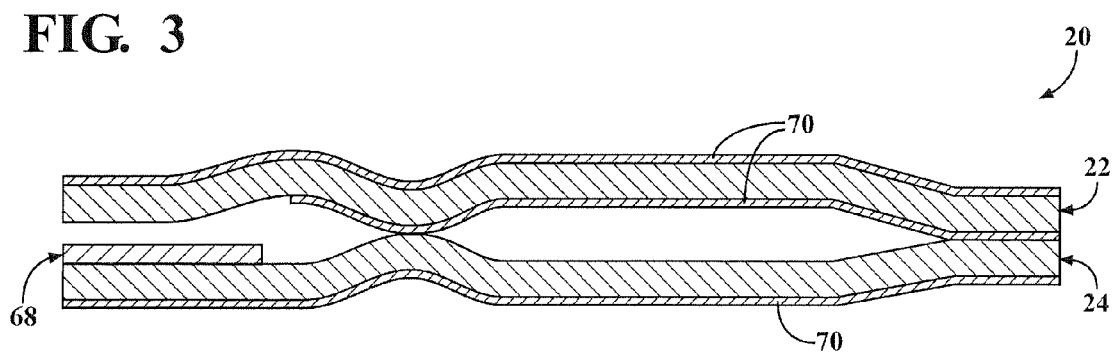
FIG. 3 is a radial cross-sectional side view of the coated multi-layer gasket according to a third exemplary embodiment of the invention.
Figure 4:
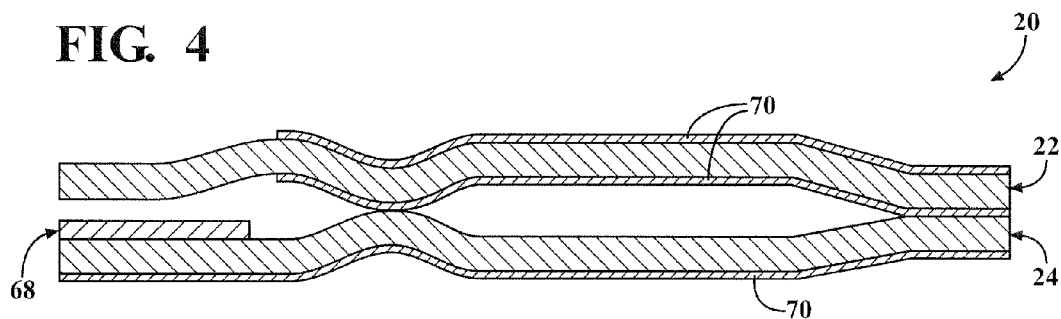
FIG. 4 is a radial cross-sectional side view of the coated multi-layer gasket according to a fourth exemplary embodiment of the invention.

Referring to the Figures, wherein like numerals indicate corresponding parts throughout the several views, a multi-layer gasket 20 for providing improved sealing performance when disposed between two components (not shown), such as an engine block and cylinder head, is generally illustrated. The gasket 20 includes a plurality of functional layers 22, 24 each presenting an outer surface 26, 28 and an oppositely facing inner surface 34, 36. Each functional layer 22, 24 also includes a full bead 42, 44 to facilitate a tight seal between the two components. The functional layers 22, 24 extend radially from inner edges 46, 48 surrounding a combustion chamber opening 56 to outer edges 58, 60. The gasket 20 also includes a stopper 68 disposed between the functional layers 22, 24 for controlling compression or adjusting the load on the full beads 42, 44. To assist in sealing the functional layers 22, 24 together, a coating material 70 is disposed on at least one surface 26, 28, 34, 36 of the functional layers 22, 24, and the coating material 70 extends along a majority of the length L of the coated surface 26, 28, 34, 36. However, unlike conventional coated multi-layer gaskets, a region 72 of the gasket 20 located along the stopper 68, between the combustion chamber opening 56 and the full beads 42, 44, includes a reduced amount of the coating material 70, or is free of the coating material 70.

FIGS. 1-10 illustrate exemplary embodiments of the coated multi-layer gasket 20 including the uncoated region 72 disposed between the combustion chamber opening 56 and the full beads 42, 44. In such embodiments, the multi-layer gasket 20 includes a first functional layer 22 extending between a first inner edge 46 surrounding the combustion chamber opening 56 and a first outer edge 58 presenting a length L therebetween. The first functional layer 22 presents a first outer surface 26 and an oppositely facing first inner surface 34 presenting a thickness t therebetween. The first functional layer 22 also includes a first full bead 42 extending circumferentially around the combustion chamber opening 56 and disposed radially between the first inner edge 46 and the first outer edge 58.

The exemplary multi-layer gasket 20 also includes a second functional layer 24 extending between a second inner edge 48 surrounding the combustion chamber opening 56 and a second outer edge 60. The second inner edge 48 and the second outer edge 60 present a length L therebetween. The second functional layer 24 also presents a second outer surface 28 and an oppositely facing second inner surface 36 presenting a thickness t therebetween. The second functional layer 24 includes a second full bead 44 axially aligned with the first full bead 42 and extending circumferentially around the combustion chamber opening 56. The second functional layer 24 typically has the same thickness t and length L as the first functional layer 22, such that the second inner edge 48 is vertically aligned with the first inner edge 46, and the second outer edge 60 is aligned with the first outer edge 58. The thickness t of the functional layers 22, 24 is typically constant along the entire length L. The functional layers 22, 24 can be formed of any conventional material, but typically are formed of stainless steel.

Figure 5:
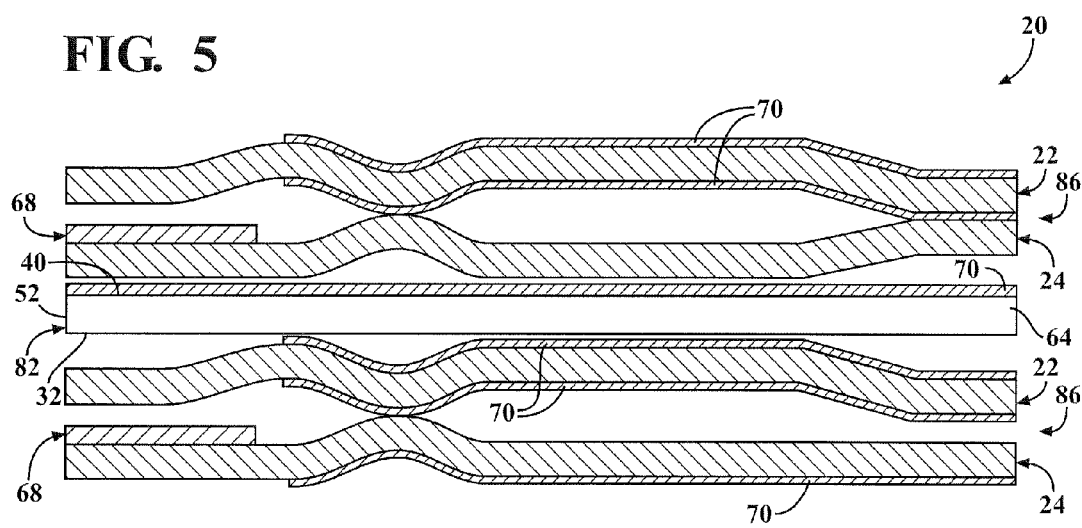
FIG. 5 is a radial cross-sectional side view of the coated multi-layer gasket according to a fifth exemplary embodiment of the invention.
Figure 6:
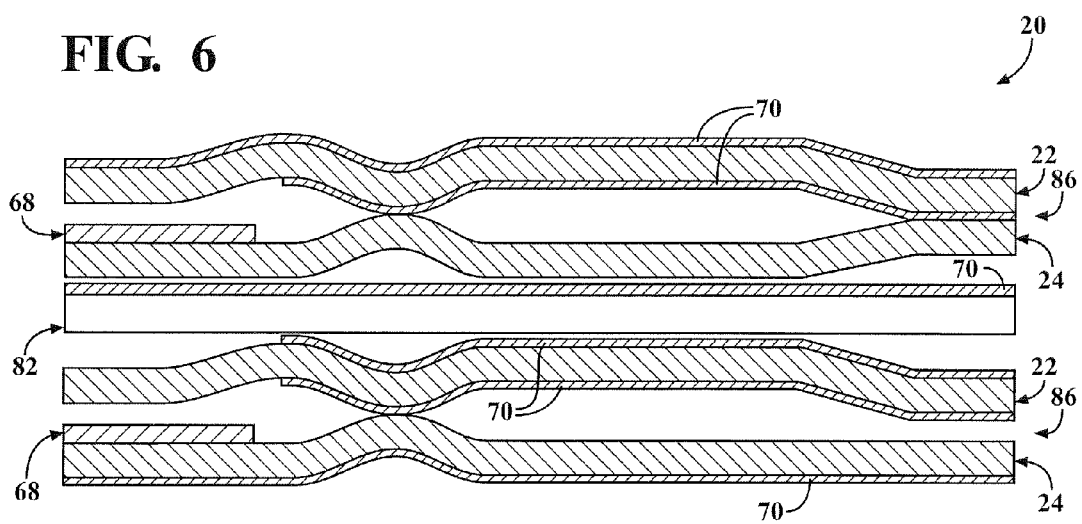
FIG. 6 is a radial cross-sectional side view of the coated multi-layer gasket according to a sixth exemplary embodiment of the invention.

In the exemplary embodiments, the full beads 42, 44 of the functional layers 22, 24 each present a convex profile along one of the surfaces, and a concave profile along the opposite surface. The convex surfaces of the full beads 42, 44 can extend toward one another, as shown in the Figures, or away from one another (not shown). At least one of the functional layers 22, 24 also optionally includes a half bead 74, 76 disposed radially between the associated full bead 42, 44 and the outer edge 58, 60. The half bead 74, 76 is typically disposed closer to the outer edge 58, 60 than to the full bead 42, 44. The half bead 74, 76 can extend around the combustion chamber opening 56, or around another opening between the two components, or along the outer edge 58, 60. If both functional layers 22, 24 include the half bead 74, 76, then those half beads 74, 76 are oftentimes joined together, typically by welding. However, if only one functional layer 22, 24 includes the half bead 74, 76, then the half bead 74, 76 can be spaced from the opposing functional layer 22, 24, as shown in FIGS. 5 and 6. At least one of the functional layers 22, 24 can also include a stepped region 78 disposed radially between the associated full bead 42, 44 and the inner edge 46, 48, as shown in FIGS. 2-6.

Figure 7:
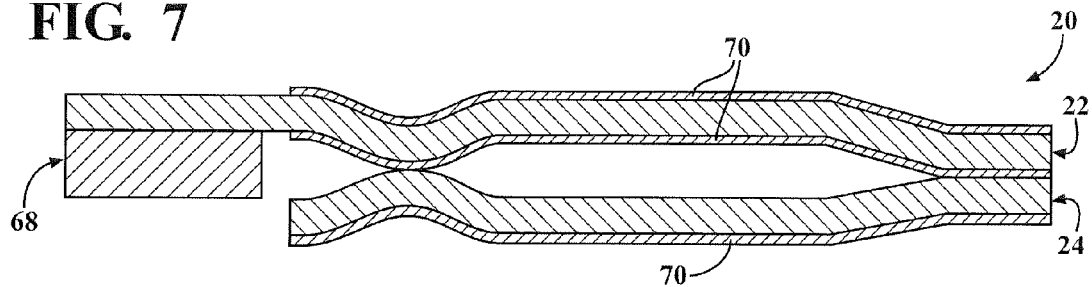
FIG. 7 is a radial cross-sectional side view of the coated multi-layer gasket according to a seventh exemplary embodiment of the invention.
Figure 8:
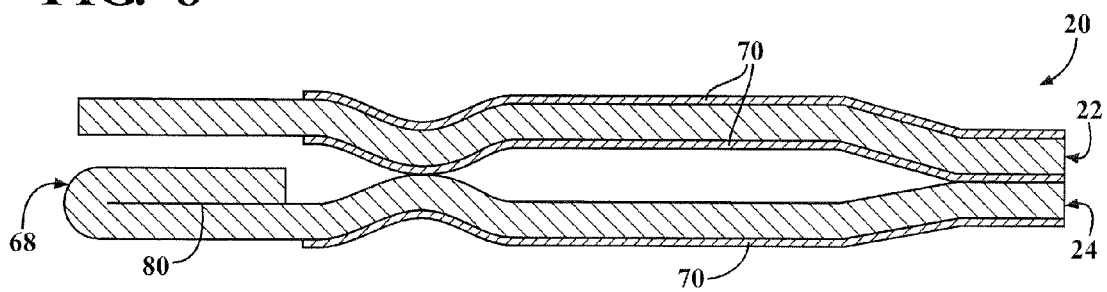
FIG. 8 is a radial cross-sectional side view of the coated multi-layer gasket according to an eighth exemplary embodiment of the invention.
Figure 9:
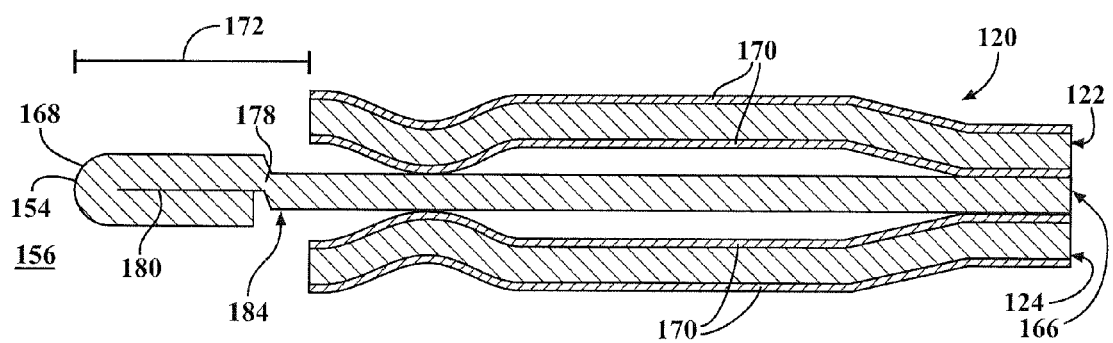
FIG. 9 is a radial cross-sectional side view of the coated multi-layer gasket according to a ninth exemplary embodiment of the invention.
Figure 10:
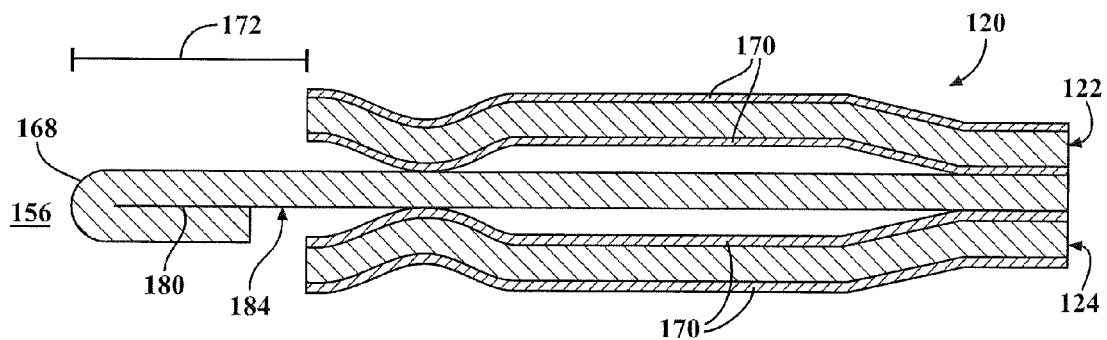
FIG. 10 is a radial cross-sectional side view of the coated multi-layer gasket according to a tenth exemplary embodiment of the invention.

The stopper 68 of the multi-layer gasket 20 is disposed between the first and second functional layers 22, 24 and radially between the combustion chamber opening 56 and the full bead 42, 44 of at least one of the functional layers 22, 24. In the embodiments of FIGS. 1-7, the stopper 68 extends from a third inner edge 50 surrounding the combustion chamber opening 56 to a third outer edge 62 disposed radially between the third inner edge 50 and the full beads 42, 44 of the functional layers 22, 24. The stopper 68 also includes a third outer surface 30 and an oppositely facing third inner surface 38 presenting a thickness t therebetween. The stopper 68 of FIGS. 1-7 is an independent component, separate from the functional layers 22, 24. Alternatively, the stopper 68 can be provided by a fold-over region 80 of one of the functional layers 22, 24 located between the inner edge 46, 48 and the full bead 42, 44, as shown in FIG. 8, or by fold-over region 180 of a distance layer 182, as shown in FIGS. 9 and 10, which will be discussed further below. In the embodiments of FIGS. 1-6, the thickness t of the stopper 68 is less than the thickness t of the functional layers 22, 24. In the embodiment of FIG. 7, a portion of the second functional layer 24 between the second full bead 44 and second inner edge 48 is removed, such that the length L of the second functional layer 24 is reduced, and the thickness t of the stopper 68 is greater than the thickness t of the functional layers 22, 24. In the embodiments of FIGS. 8-10, the thickness t of the stopper 68 is greater than or equal to the thickness t of the functional layers 22, 24. The stopper 68 can be formed of any conventional material, which is typically a metal material.

The coating material 70 is disposed on at least one of the surfaces 26, 28, 34, 36 of at least one of the functional layers 22, 24 for sealing the functional layers 22, 24 together and preventing fluid or gas leaks. The coating material 70 can extend along both surfaces 26, 28, 34, 36 of each functional layer 22, 24, or only one of the surfaces 26, 28, 34, 36. In the embodiments of FIGS. 1-8, the coating material 70 is disposed on less than all of the surfaces 26, 28, 34, 36 of the functional layers 22, 24. The coating material 70 extends along a majority of the length L of the at least one coated surface 26, 28, 34, 36, and may extend along the entire length L of one or more of the coated surface 26, 28, 34, 36. However, a region 72 located along the stopper 68 includes a reduced amount of the coating material 70, or remains uncoated, in order to improve stability and provide a more rigid joint between the functional layers 22, 24. Elimination of the coating material 70 in this region 72 also reduces relative motion between the functional layers 22, 24 due to thermal or combustion factors, and can also provide increased protection of the full beads 42, 44.

In the embodiments of FIGS. 1-8, at least one of the surfaces 26, 28, 34, 36 including the coating material 70 along a majority of the length L also includes the region 72 having the reduced amount of the coating material 70, or no coating material 70, between the associated inner edge 46, 48 and the full bead 42, 44. In these embodiments, the reduced coating region 72 extends continuously from the inner edge 46, 48, along the stopper 68, and to a position located radially outwardly of the stopper 68. The coating material 70 then extends continuously along the majority of the coated surface 26, 28, 34, 36 from the end of the reduced coating region 72 to the associated outer edge 58, 60. Typically, the coating material 70 is disposed on a plurality of the surfaces 26, 28, 34, 36 of the functional layers 22, 24, and at least two of the coated surfaces 26, 28, 34, 36 of the functional layers 22, 24 are free of the coating material 70 in the region 72 disposed between the associated inner edge 46, 48 and the full bead 42, 44. However, the coating material 70 can still extend continuously from the inner edge 46, 48 to the outer edge 58, 60 on at least one of the other surfaces 26, 28, 34, 36, as shown in FIGS. 3, 4, 6, and 7.

The coating material 70 presents a thickness t which is less than the thickness t of the functional layers 22, 24 and less than the thickness t of the stopper layer 84. In the reduced coating region 72, if any coating material 70 is present, the thickness t of the coating material 70 is reduced compared to the thickness t of the coating material 70 along the rest of the surface 26, 28, 34, 36.

Any conventional coating composition used to coat or seal multi-layer gaskets can be used as the coating material 70 of the subject invention. Typically, the composition of the coating material 70 is elastomer-based, rubber-based, resin-based, or polymer-based. In this embodiment, the coating material 70 includes at least one elastomer, rubber, resin, and/or polymer in an amount of at least 50 weight percent (wt. %), or at least 60 wt. %, or at least 70 wt. %, or at least 80 wt. %, or at least 90 wt. %, or at least 95 wt. %, based on the total weight of the coating material 70. Exemplary materials that can be used to form the coating material 70 include fluoroelastomers, such as FKM materials, silicone, nitrile butadiene rubber, molybdenum disulfide, and tetrafluoroethylene or polytetrafluoroethylene (PTFE), sold under the registered trademark Teflon®.

In the exemplary embodiments of FIGS. 5 and 6, the multi-layer gasket 20 includes a plurality of pairs 86 of the functional layers 22, 24 axially aligned with one another. The full beads 42, 44 and the edges 46, 48, 58, 60 of the functional layers 22, 24 are again aligned. In addition, a distance layer 82 is disposed between adjacent pairs 86 of functional layers 22, 24. The distance layer 82 extends from a fourth inner edge 52 surrounding the combustion chamber opening 56 to a fourth outer edge 64 aligned with at least one of the outer edges 58, 60 of the functional layers 22, 24. The distance layer 82 also presents a fourth inner surface 40 and a fourth outer surface 32 presenting a thickness t therebetween. Any conventional material can be used to form the distance layer 82, such as stainless steel or a less expensive metal, such as low carbon steel. The coating material 70 is typically disposed on at least one of the fourth inner and outer surfaces 32, 40, and typically extends continuously from the fourth inner edge 52 to the fourth outer edge 64 of the distance layer 82.

FIGS. 9 and 10 illustrate the multi-layer gasket 120 according to another exemplary embodiment of the invention. In these embodiments, a portion of each functional layer 122, 124 located between the associated full bead 142, 144 and the inner edge 146, 148 is removed, such that the length L of the functional layers 122, 124 is reduced, and a stopper layer 184 is disposed between the first and second functional layers 122, 124. The stopper layer 184 extends radially between a fifth inner edge 154 surrounding the combustion chamber opening 156 and a fifth outer edge 166 axially aligned with the outer edge 158, 160 of at least one of the functional layers 122, 124. The stopper layer 184 includes the stopper 168 disposed inwardly of the functional layers 122, 124, at a location radially between the combustion chamber opening 156 and the inner edges 146, 148 of the functional layers 22, 24. In these embodiments, the stopper 168 is provided by a fold-over region 180 of the stopper layer 184. The stopper 168 is located radially between the combustion chamber opening 156 and the inner edges 146, 148 of the functional layers 122, 124. In the embodiment of FIG. 9, the stopper layer 184 includes a stepped region 178 radially between the fold-over region 180 and the inner edges 146, 148 of the functional layers 122, 124, in order to offset the stopper 168 and locate the stopper 168 centrally between the functional layers 122, 124. The coating material 170 is disposed on at least one of the surfaces 126, 128, 134, 136, of at least one of the functional layers 122, 124, and the coating material 170 extends continuously from the inner edge 146, 148 to the outer edge 158, 160 of the at least one coated functional layer 122, 124. Typically, the coating material 70 is disposed on a plurality of the surfaces 126, 128, 134, 136 of the functional layers 122, 124. Since the inner edges 146, 148 of the functional layers 122, 124 of FIGS. 9 and 10 are spaced from the stopper 168, such that the functional layers 122, 124 do not extend radially along the stopper 168, the thickness t of the coating material 170 along the functional layers 22, 24 does not need to be reduced.

Obviously, many modifications and variations of the present invention are possible in light of the above teachings and may be practiced otherwise than as specifically described while within the scope of the appended claims.

What is claimed is:

1. A multi-layer gasket, comprising:
a first functional layer extending between a first inner edge surrounding a combustion chamber opening and a first outer edge, said first inner edge and said first outer edge presenting a length therebetween, said first functional layer presenting a first outer surface and an oppositely facing first inner surface, said first functional layer including a first full bead disposed radially between said first inner edge and said first outer edge,
a second functional layer extending between a second inner edge surrounding said combustion chamber opening and a second outer edge, said second inner edge and said second outer edge presenting a length therebetween, said second functional layer presenting a second outer surface and an oppositely facing second inner surface, and said second functional layer including a second full bead axially aligned with said first full bead;
a stopper disposed between said first and second functional layers and radially between said inner edge and said full bead of at least one of said functional layers;
a coating material disposed on at least one of said surfaces of at least one of said functional layers, said coating material extending along said full bead and along a majority of said length of said at least one surface; and
wherein a reduced amount of said coating material is disposed along a region of said at least one surface extending continuously from said inner edge to adjacent said full bead.

2. The multi-layer gasket of claim 1, wherein said coating material presents a thickness, and said reduced amount of coating material disposed along said region has a lower thickness than said coating material disposed between said region and said outer edge.

3. The multi-layer gasket of claim 1, wherein said region of said at least one surface is free of said coating material.

4. The multi-layer gasket of claim 1, wherein said region of said at least one surface extends continuously from said inner edge along said stopper to a position located radially outwardly of said stopper.

5. The multi-layer gasket of claim 1, wherein said coating material extends continuously along said at least one surface from said outer edge to said region including said reduced amount of coating material.

6. The multi-layer gasket of claim 1, wherein said coating material seals said functional layers together.

7. The multi-layer gasket of claim 1, wherein said coating material is disposed on a plurality of said surfaces of said functional layers, and at least two of said coated surfaces of said functional layers are free of said coating material along said region extending continuously from said inner edge to adjacent said full bead.

8. The multi-layer gasket of claim 1, wherein said coating material extends continuously from said inner edge to said outer edge along at least one of said surfaces of at least one of said functional layers.

9. The multi-layer gasket of claim 1, wherein said stopper extends from a third inner edge surrounding said combustion chamber opening to a third outer edge disposed radially between said combustion chamber opening and said full beads of said functional layers, and said stopper presents a third outer surface and an oppositely facing third inner surface.

10. The multi-layer gasket of claim 1, wherein said full beads present a convex profile along one of said inner and outer surfaces and a concave profile along the opposite one of said inner and outer surfaces.

11. The multi-layer gasket of claim 1, wherein at least one of said functional layers includes a half bead disposed radially between said full bead and said outer edge.

12. The multi-layer gasket of claim 1, wherein at least one of said functional layers includes a stepped region disposed radially between said full bead and said inner edge.

13. The multi-layer gasket of claim 1, wherein each of said functional layers and said stopper and said coating material present a thickness, and said thickness of said stopper is less than said thickness of said functional layers, and said thickness of said coating material is less than said thickness of said stopper.

14. The multi-layer gasket of claim 1, wherein each of said functional layers and said stopper and said coating material present a thickness, and said thickness of said stopper is greater than said thickness of said functional layers, and said thickness of said coating material is less than said thickness of said functional layers.

15. The multi-layer gasket of claim 1 including a plurality of pairs of said functional layers aligned with one another, and wherein said full beads of said functional layers are axially aligned.

16. The multi-layer gasket of claim 15 including a distance layer disposed between adjacent pairs of functional layers, wherein said distance layer extends from a fourth inner edge surrounding said combustion chamber opening to a fourth outer edge aligned with at least one of said outer edges of said functional layers, said distance layer presents a fourth inner surface and a fourth outer surface, and said coating material is disposed on at least one of said fourth inner and outer surfaces.

17. The multi-layer gasket of claim 1, wherein said stopper is provided by a fold-over region of one of said functional layers.

18. A multi-layer gasket, comprising:
a first functional layer extending between a first inner edge surrounding a combustion chamber opening and a first outer edge, said first inner edge and said first outer edge presenting a length therebetween, said first functional layer presenting a first outer surface and an oppositely facing first inner surface, said first functional layer including a first full bead disposed radially between said first inner edge and said first outer edge;
a second functional layer extending between a second inner edge surrounding said combustion chamber opening and a second outer edge, said second inner edge and said second outer edge presenting a length therebetween, and said second functional layer including a second full bead axially aligned with said first full bead;
a stopper layer disposed between said first and second functional layers and extending radially between a fifth inner edge surrounding said combustion chamber opening and a fifth outer edge, and said stopper layer including a stopper disposed radially between said combustion chamber opening and said inner edges of said functional layers; and
a coating material disposed on at least one of said surfaces of at least one of said functional layers, and said coating material extending continuously from said inner edge to said outer edge of said at least one functional layer, wherein said coating material is present in a greater amount along said at least one functional layer than along a region of said stopper layer extending continuously from said fifth inner edge of said stopper layer to said inner edges of said functional layers.

19. The multi-layer gasket of claim 18, wherein said stopper is provided by a fold-over region of said stopper layer disposed radially between said fifth inner edge and inner edges of said functional layers.

20. The multi-layer gasket of claim 19, wherein said stopper layer includes a stepped region disposed radially between said fold-over region and said inner edges of said functional layers.

* * * * *